United States Patent
Wang

(10) Patent No.: US 6,230,914 B1
(45) Date of Patent: May 15, 2001

(54) CONTAINER COVER

(76) Inventor: Wen-Tsan Wang, P.O. Box 82-144, Taipei (TW)

( * ) Notice: Subject to any disclaimer, the term of this patent is extended or adjusted under 35 U.S.C. 154(b) by 0 days.

(21) Appl. No.: 09/635,072

(22) Filed: Aug. 9, 2000

(51) Int. Cl.⁷ .................................................. B65D 51/00
(52) U.S. Cl. ............................ 217/56; 220/369; 220/370
(58) Field of Search .............................. 220/254, 367.1, 220/369, 370, 371, 372; 217/56

(56) References Cited

U.S. PATENT DOCUMENTS

| | | | |
|---|---|---|---|
| 287,425 | * 10/1883 | Dowdell | 220/370 |
| 1,723,293 | * 8/1929 | Mielziner | 217/56 |
| 2,020,584 | * 11/1935 | Spiegl | 217/56 |
| 2,651,815 | * 9/1953 | Aylor | 217/56 |
| 3,797,693 | * 3/1974 | Baker | 220/370 |
| 3,807,596 | * 4/1974 | Baker | 220/369 |
| 4,747,392 | * 5/1988 | Rogers | 220/370 X |
| 6,056,146 | * 5/2000 | Varakian et al. | 220/370 |

* cited by examiner

Primary Examiner—Steven Pollard
(74) Attorney, Agent, or Firm—A & J

(57) ABSTRACT

A container cover having a bamboo open frame and a meshed structure of bamboo mounted within the open frame, the open frame having a plurality of mounting holes spaced around an inside wall thereof; the meshed structure being formed of a plurality of bamboo strips woven together, the bamboo strips having tips suspended around the border of the meshed structure and respectively fastened to the mounting holes in the open frame.

2 Claims, 4 Drawing Sheets

CONTAINER COVER

BACKGROUND OF THE INVENTION

The present invention relates to a container cover adapted for closing the open side of a container, and more particularly to such a container cover, which comprises an open frame of bamboo, and a meshed structure of bamboo suspended inside the open frame.

Regular containers are commonly attached with a cover. A variety of materials including ceramics, glass, wood, plastics, stainless steel, and etc. may be used for making container covers. Nowadays, bamboo material has been intensively used for making furniture, ornamental items, containers, and etc. in graceful ancient style. According to conventional methods, a container cover of bamboo is generally comprised of an open frame and a meshed structure fastened to the inside of the open frame by glue or stitches. The meshed structure tends to be pulled away from the open frame if it is fastened to the open frame by glue. The method of fastening the meshed structure to the open frame by stitches consumes much labor, and greatly increases the manufacturing cost of the container cover.

SUMMARY OF THE INVENTION

It is one object of the present invention to provide a bamboo container cover, which is easy and inexpensive to manufacture. It is another object of the present invention to provide a bamboo container cover, which is durable in use. According to one aspect of the present invention, the bamboo container cover comprises a bamboo open frame and a meshed structure of bamboo mounted within the open frame, wherein the open frame has a plurality of mounting holes spaced around an inside wall thereof, and the meshed structure is formed of a plurality of bamboo strips woven together, having tips suspended around the border area thereof and respectively fastened to the mounting holes in the open frame.

DETAILED DESCRIPTION OF THE PREFERRED EMBODIMENT

Figure 1:
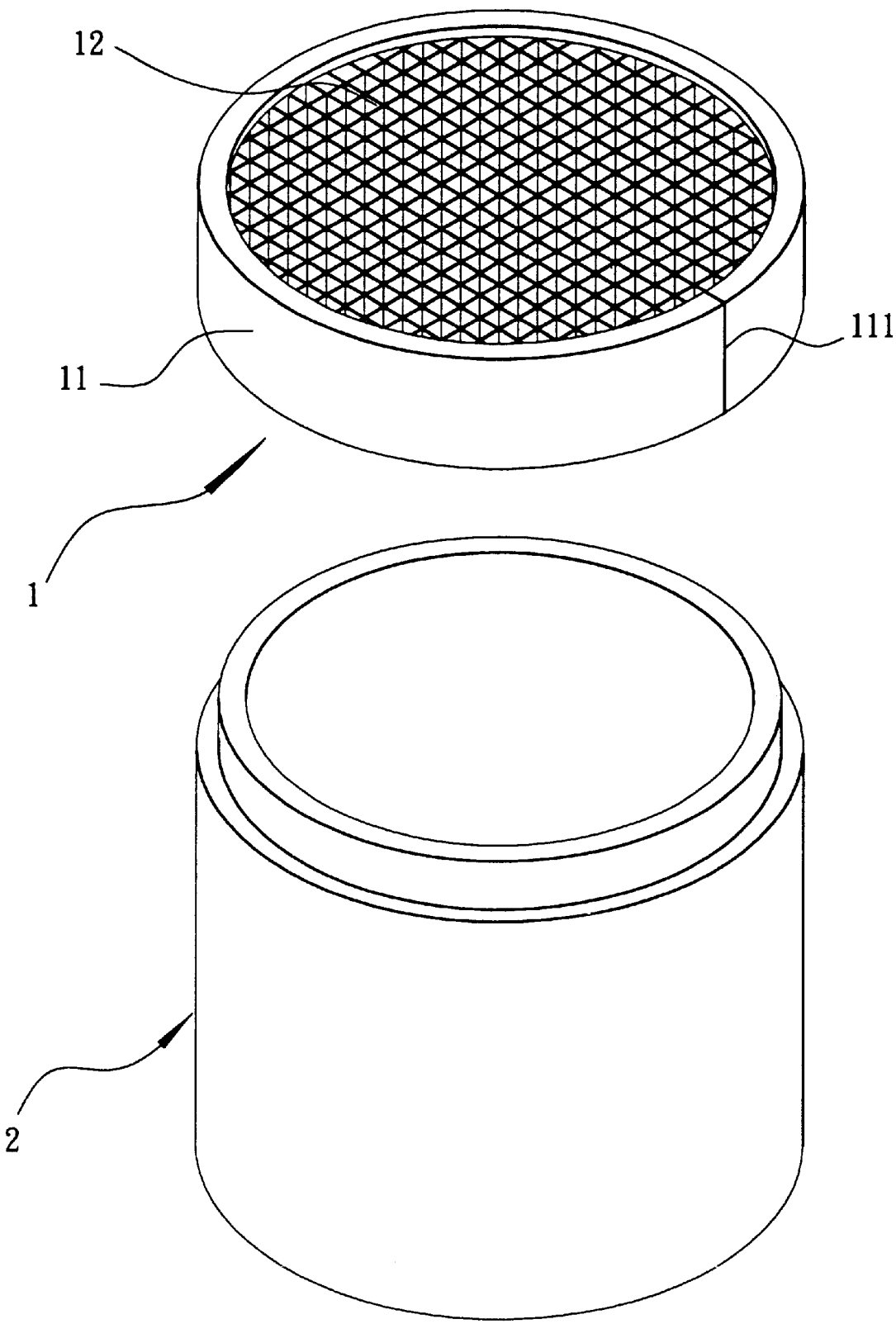
FIG. 1 illustrates a bamboo container and a bamboo container cover according to the present invention.

Referring to FIG. 1, a container cover 1 is adapted to close the top open side of a container 2. The container cover 1 and the container 2 are made of bamboo. The container cover 1 comprises an open frame 11, and a meshed structure 12 mounted within the open frame 11.

Figure 2:
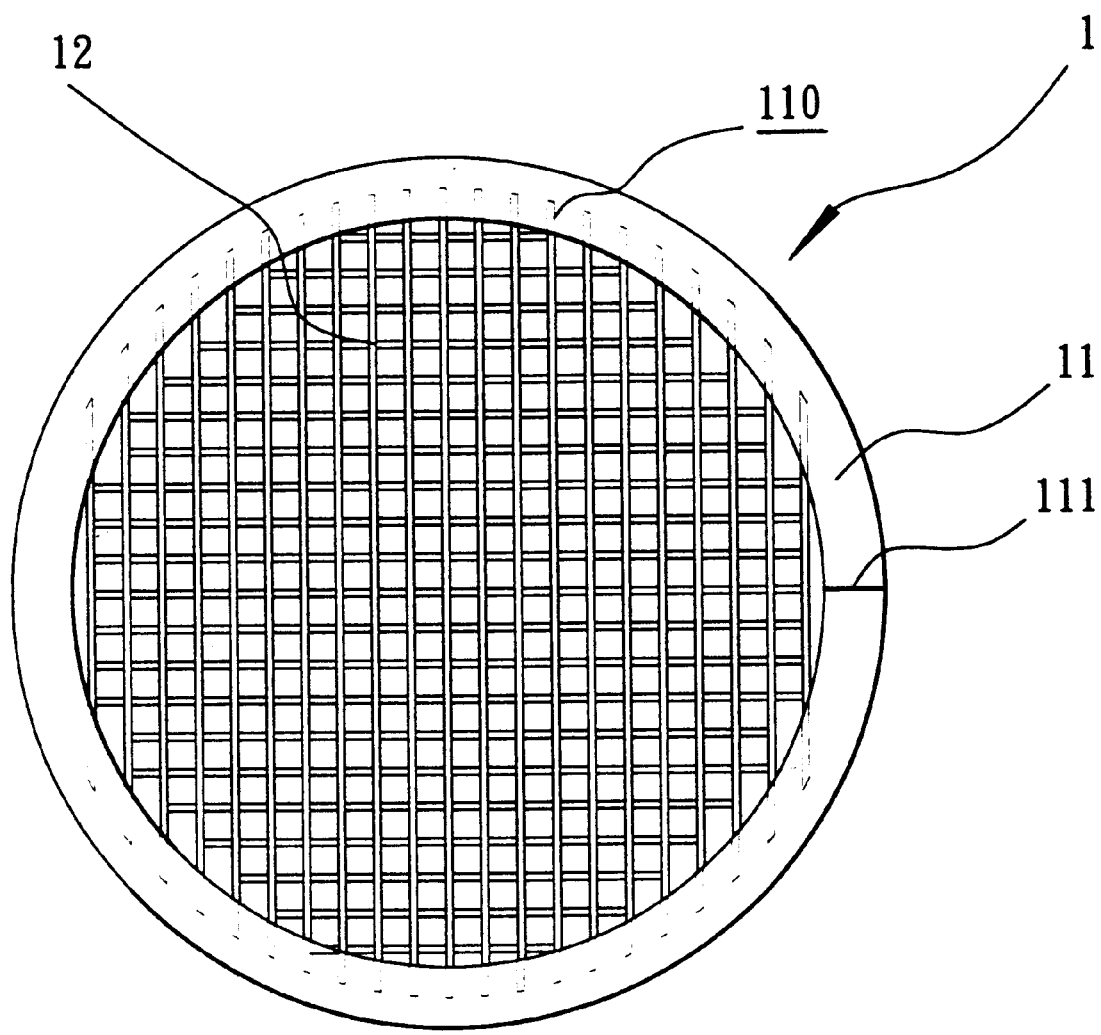
FIG. 2 is a top plain view of the bamboo container cover shown in FIG. 1.
Figure 3:
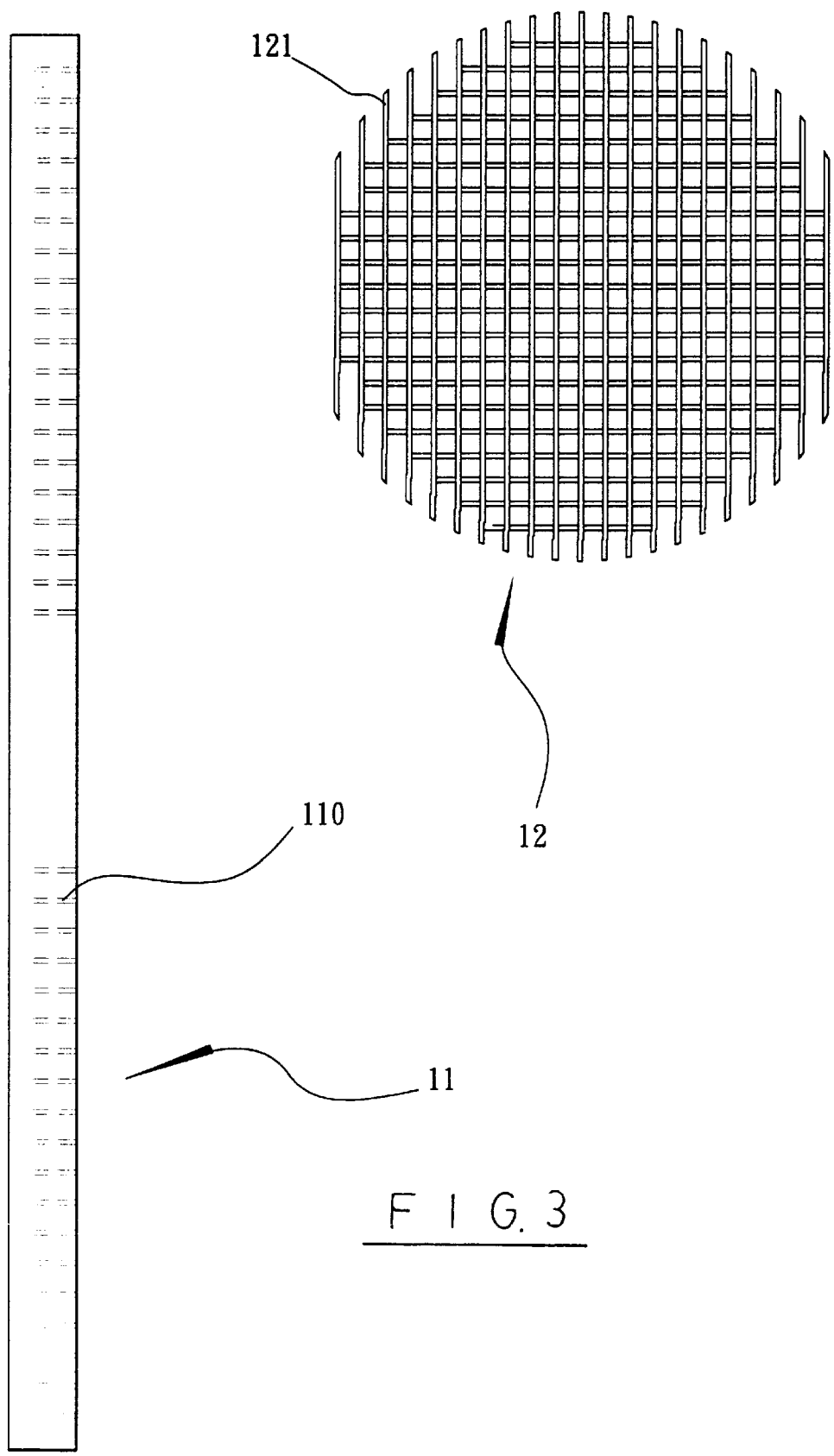
FIG. 3 is an extended out view of the bamboo container cover according to the present invention.

Referring to FIGS. 2 and 3, the open frame 11 is made of a bamboo belt, having a plurality of blind holes 110 on one side wall thereof. After the formation of the blind holes 110 on one side wall of the bamboo belt, the ends of the bamboo belt are covered with glue and adhered together, and then hardened by a dry heat. The meshed structure 12 is made of thin strips of bamboo, having projecting tips 121 suspended around the border area thereof. Before joining the ends 111 of the bamboo belt of the open frame 11, the projecting tips 121 of the meshed structure 12 are respectively engaged into the blind holes 110 of the open frame 11. After insertion of the projecting tips 121 of the bamboo strips of the meshed structure 12 into the blind holes 110 of the open frame 11, the ends 111 of the bamboo belt of the open frame 11 are fastened together.

Figure 4:
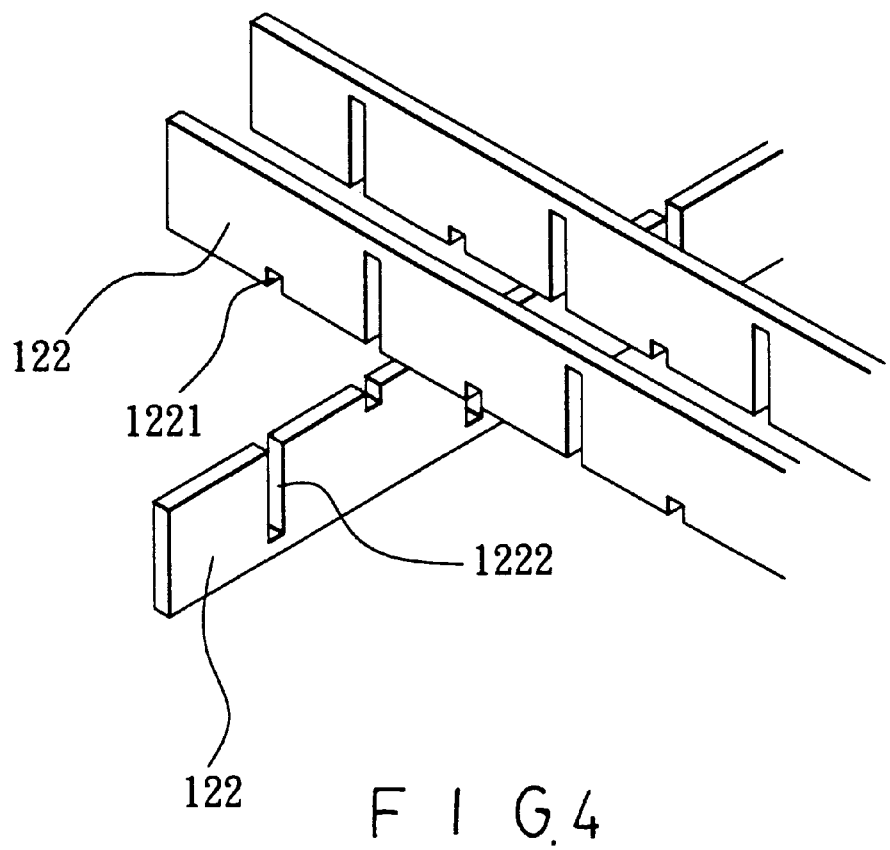
FIG. 4 is an exploded view in an enlarged scale of a part of the meshed structure for the bamboo container cover according to the present invention.
Figure 5:
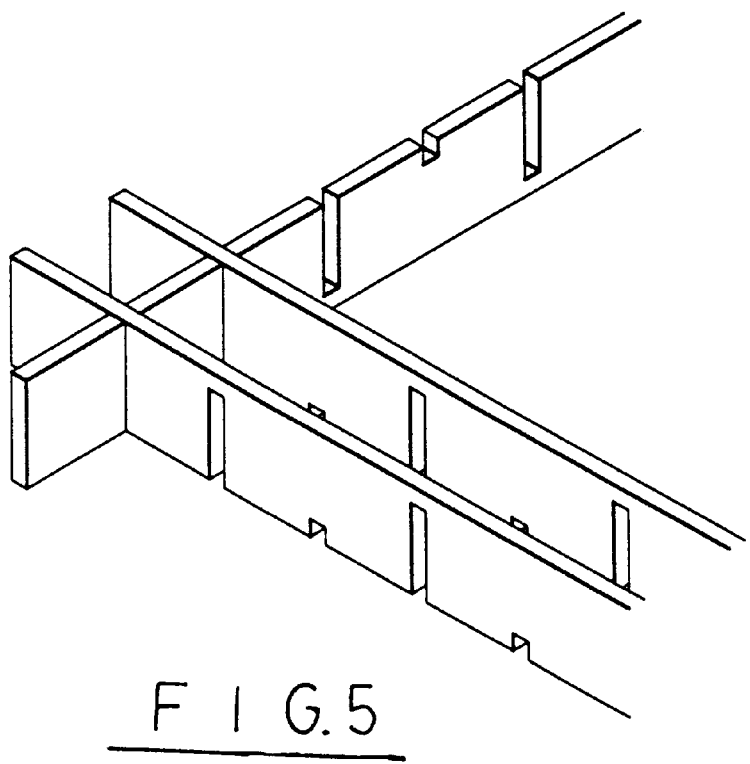
FIG. 5 is an assembly view of FIG. 4.

Referring to FIGS. 4 and 5, and FIG. 3 again, the meshed structure 12 is comprised of a plurality of transversely longitudinally connected bamboo strips 122. The bamboo strips 122 each have a plurality of shadow notches 1221 and deep notches 1222 alternatively arranged along one side edge (see FIG. 4). By engaging one deep notch 1222 of one bamboo strip 122 with one shadow notch 1221 of another, the bamboo strips 122 are connected together (see FIG. 5). After the bamboo strips 122 have been fastened together, the tips 121 of the bamboo strips 122 suspended around the border area of the meshed structure 12 (see also FIG. 3). Before inserting the tips 121 of the bamboo strips 122 of the meshed structure 12 in the blind holes 110 of the open frame 11, the tips 121 are covered with glue. After setting of the glue, the tips 121 of the bamboo strips 122 of the meshed structure 12 are firmly secured to the open frame 11.

It is to be understood that the drawings are designed for purposes of illustration only, and are not intended for use as a definition of the limits and scope of the invention disclosed.

What the invention claimed is:

1. A container cover comprising an open frame and a meshed structure mounted within said open frame, wherein said open frame is made of bamboo, having a plurality of mounting holes spaced around an inside wall thereof; said meshed structure comprises a plurality of strips of springy material woven together, said strips of springy material having tips suspended around the border of said meshed structure and respectively fastened to the mounting holes inside said open frame.

2. The container cover of claim 1 wherein said strips of springy material are made of bamboo.

* * * * *